United States Patent Office 3,157,621
Patented Nov. 17, 1964

3,157,621
POLYETHER BASED URETHANES PREPARED IN THE PRESENCE OF AMMONIUM ACETATE
Edward R. Degginger, Syracuse, N.Y., assignor to Allied Chemical Corporation, New York, N.Y., a corporation of New York
No Drawing. Filed June 30, 1960, Ser. No. 39,764
2 Claims. (Cl. 260—77.5)

This invention relates to polyethers and more particularly refers to the incorporation of an additive in polyethers to enhance their properties in the production of polyurethane foam by reaction with isocyanates.

In the manufacture of flexible polyurethane foams from polyethers and tolylenediisocyanate, it is important that raw material batches give consistent reaction rates in the production process. This is necessary to produce foams of unvarying high quality on a rapid and uniform production schedule. Since the reaction rate is largely dependent on the reactivity of the polyether, it is necessary that this component possess consistent properties in this respect. Another factor which must be considered in conjunction with reaction rate is viscosity. Too fast or too slow a rate can be equally deleterious since foaming action and viscosity increase must be closely coordinated to get solidification at the proper moment. If rate of reaction is too fast, polyurethane will set before foaming is complete and poor foam will result. If rate is too slow, foam will collapse before setting occurs. Also the acidity or the sodium and potassium content of the polyether must be kept to a minimum because of rigid specifications in these values. Further, only minimum amount of ash or combustion residue content in polyethers can be tolerated.

An object of the present invention is to provide an additive to polyethers which will enhance the properties of the polyethers for reaction with isocyanates in the production of flexible urethane foam.

Another object of the present invention is to provide an additive for polyethers which will increase reactivity of polyethers with tolylenediisocyanate without significant increase of acidity, sodium, potassium, and ash or combustion residue contents.

In accordance with the present invention improved properties are imparted to polyethers by addition of trace quantities, 20-60 preferably 30-40 parts per million of ammonium acetate. These trace quantities of ammonium acetate are readily dissolved in the polyethers by the mere addition and, if desired although not essential, stirring the mixture.

Ammonium acetate, particularly in these trace quantities, does not add to the acidity of the polyether nor does it contribute to the ash content of the polyether. Any material increase in these values is detrimental to the reaction. The small quantities of ammonium acetate have been found to accelerate the reactivity by approximately 10%. Further, the ammonium acetate gives an ideal reaction rate increase with isocyanate in that the viscosity increase with this increase in foaming action gives solidification at the proper moment. In the course of extensive experimentation with additives it was found that while many additives have an effect upon the polyether they contribute undesirable properties, for example ammonium carbonate speeded up the reaction but it was found that it had the unsatisfactory property of causing the polyurethanes to set before foaming was complete. On the other hand, acid halides and inorganics slowed down the reaction to such an extent that the foam collapsed before setting. Additives which contain sodium or potassium were unsatisfactory because they raise the concentration of these elements in the polyether beyond the specification limits. There was no rule or pattern to follow from these additives and each additive had its own peculiar property which could not be predicted beforehand. Indeed, it was found that quantities of ammonium acetate above about 60 parts per million reversed the trend of acceleration. Ammonium acetate in amount of less than 20 parts per million was too small to be materially effective.

The polyethers with which the present invention is concerned are well-known compounds produced by base-catalyzed addition of propylene oxide to an active hydrogen-containing initiator e.g. propylene glycol, glycerine, triethanolamine, or similar polyhydroxyl compounds, as more fully described in application Serial No. 806,331, filed April 14, 1959, now U.S. Patent 3,117,998, entitled Propylene Oxide Polyethers. The present invention is particularly concerned with propylene oxide polyether diols having a molecular weight within the range of 1500 to 2500, preferably about 1900–2100, because these propylene oxide polyethers have been found particularly adapted for reaction with tolylenediisocyanate to produce flexible polyurethane foams.

The following comparative examples illustrate the effectiveness of ammonium acetate for increasing polyether reactivity with tolylenediisocyanate. In these examples propylene oxide polyether, 2000 molecular weight diol, was used in runs in which the reaction rate of the untreated polyether was compared with the same material containing varying amounts of ammonium acetate i.e. 30, 40 and 60 p.p.m.

The influence of ammonium acetate on the reaction rate was measured in a polyether-tolylenediisocyanate system using an OH to NCO ratio of 1 to 1.05. Each mixture for the tests was heated at 120° C. and mechanically stirred under an atmosphere of dry nitrogen. The rate of viscosity increase of the mixture was taken as a measure of the reactivity, i.e. the more reactive system being that which reached a given viscosity over a shorter time period.

The results are tabulated below. Table I shows comparative data to indicate that the addition of 30 to 40 p.p.m. ammonium acetate to the polyether improves the reaction rate over the untreated material to the extent of over 10% reduction in the time necessary to reach a viscosity of 20,000 cps.

Table I

| $NH_4OAc$ added (p.p.m.) | none | 30 | 40 | 60 |
|---|---|---|---|---|
| Reaction Temperature, °C | 120-122 | 120-122 | 120-122 | 120-122 |
| Time (minutes) to reach viscosity: | | | | |
| 10,000 cps | 165 | 130 | 142 | 128 |
| 15,000 cps | 216 | 175 | 195 | 188 |
| 20,000 cps | 246 | 212 | 228 | 231 |

Further comparative tests of propylene oxide polyether of 2000 molecular weight with tolylenediisocyanate were made without any addition of ammonium acetate and with the addition of 40 p.p.m. of ammonium acetate. The resulting foam was also tested to determine its compression set which is the percent of permanent distortion shown by a foam after being compressed to a specified degree for a specified time. The data in Table II below summarizes the results of these tests.

Table II

| | Untreated | 40 p.p.m. $NH_4OAc$ |
|---|---|---|
| Reaction Rate (120° C.): | | |
| Time to reach— | | |
| 10,000 cps min | 156 | 145 |
| 15,000 cps do | 214 | 180 |
| 20,000 cps do | 252 | 218 |
| Compression set: | | |
| 6 hr. test percent | 5.9 | 5.4 |
| 22 hr. test do | 15.4 | 11.5 |

I claim:

1. In a process for the production of urethane by reaction of an alkylene oxide polyether polyhydroxyl compound with an organic polyisocyanate, the improvement which comprises effecting said reaction in the presence of 20–60 parts per million of ammonium acetate based on the alkylene oxide polyether polyhydroxyl compound.

2. In a process for the production of urethane by reaction of propylene oxide polyether diols having a molecular weight within the range of 1500 to 2500 with an organic polyisocyanate, the improvement which comprises effecting said reaction in the presence of 20–60 parts per million of ammonium acetate based on the propylene oxide polyether diols.

References Cited in the file of this patent

UNITED STATES PATENTS

| | | |
|---|---|---|
| 2,809,177 | Shokal | Oct. 8, 1957 |
| 2,879,233 | Pace | Mar. 24, 1959 |
| 3,033,825 | Murphy | May 8, 1962 |

FOREIGN PATENTS

| | | |
|---|---|---|
| 770,526 | Great Britain | Mar. 20, 1957 |

OTHER REFERENCES

Luder et al.: General Chemistry, W. B. Saunders Co., Philadelphia, Pa., pages 439–440 (1953).